(12) United States Patent
Lee

(10) Patent No.: US 11,516,524 B2
(45) Date of Patent: Nov. 29, 2022

(54) ONLINE BASED BROADCASTING APPARATUS AND METHOD

(71) Applicant: INDUSTRY-ACADEMIC COOPERATION FOUNDATION, YONSEI UNIVERSITY, Seoul (KR)

(72) Inventor: Chul Hee Lee, Goyang-si (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 0 days.

(21) Appl. No.: 17/225,485

(22) Filed: Apr. 8, 2021

(65) Prior Publication Data

US 2021/0321147 A1 Oct. 14, 2021

(30) Foreign Application Priority Data

Apr. 9, 2020 (KR) .......................... 10-2020-0043317

(51) Int. Cl.
*H04N 21/238* (2011.01)
*H04N 21/234* (2011.01)

(52) U.S. Cl.
CPC ......... *H04N 21/238* (2013.01); *H04N 21/234* (2013.01)

(58) Field of Classification Search
CPC ............... H04N 21/234; H04N 21/238; H04N 21/26283; H04N 21/4221; H04N 21/482; H04N 21/64322
See application file for complete search history.

(56) References Cited

U.S. PATENT DOCUMENTS

| 2010/0050217 A1* | 2/2010 | Suh .................. H04N 21/23614 725/87 |
| 2015/0289024 A1* | 10/2015 | Yoon .................. H04N 21/4622 725/40 |

FOREIGN PATENT DOCUMENTS

| JP | WO2017/090459 A1 | 9/2018 |
| KR | 10-2009-0030835 A | 3/2009 |
| KR | 10-2011-0013934 A | 2/2011 |
| KR | 10-2017-0107873 A | 9/2017 |

* cited by examiner

*Primary Examiner* — Rong Le

(57) ABSTRACT

An apparatus for providing online multimedia contents acquires, in a pre-designated manner, a content table addresses, in which a content table consisting of a plurality of content information with each set time to be played back is stored, maps and stores the content table address to a designated channel, obtains the content table based on the content table address, analyzes the content information corresponding to the current time among the plurality of content information included in the content table to obtain a content address where a multimedia content is stored, acquires the multimedia content online based on the obtained content address, outputs the multimedia content through TV, thereby allowing a TV user to easily view various multimedia contents available online by simply changing the channel buttons of the remote control and thereby maximizing the user convenience of online multimedia contents.

18 Claims, 10 Drawing Sheets

PWD: YS3939S303#d aaa.com/table.txt  36 bbb.com/table.txt  37 ccc.com/table.txt  38

ONLINE BASED BROADCASTING APPARATUS AND METHOD

CROSS-REFERENCE TO RELATED APPLICATION

The present application claims priority under 35 U.S.C 119(a) to Korean Patent Application No. 10-2020-0043317, filed on Apr. 9, 2020, which is herein incorporated by reference in its entirety.

BACKGROUND

1. Technical Field

The present disclosure relates to an apparatus and a method for providing multimedia contents, more particularly to an apparatus and a method for providing online based multimedia contents.

2. Description of the Related Art

The OTT (Over The Top) service represents a service that provides multimedia contents through a general-purpose Internet network instead of conventional radio wave or cable. As the OTT-based multimedia service is rapidly spreading in recent years, it is rapidly eroding the demand for existing over-the-air broadcasting, cable TV, IPTV, and the like. This trend is expected to accelerate further and the OTT-based multimedia service is expected to replace the traditional multimedia content market.

Currently, the OTT service can be used with a set-top box that receives multimedia contents online provided by a pre-designated OTT service provider and outputs them to a traditional TV. Alternatively, a smart TV or the like can receive and display multimedia contents by directly accessing them online. However, since both the set-top box and the smart TV currently use a remote control as the input interface for users to enter commands, text input (character input) is not easy. As a result, whereas multimedia contents provided by commercial OTT service providers such as radio broadcasting, cable, IPTV or the like are designed to be easily accessed by remote control operations, it is not easy to access general multimedia contents on the Internet since they require the user to directly search or enter an address. Moreover, even if the user already knows the address of an Internet site where multimedia contents are stored, there is a limitation in that it is not easy to access the site because it is difficult to input characters through remote control operations.

Meanwhile, in recent years, as streaming service platforms for multimedia contents have been provided in a variety of ways, User Created Contents (UCC) have increased significantly. Thus, viewers' demands for such user created contents are increasing. In the case of user created contents, since they are produced in a wide variety of fields, the user needs to directly search for them in most cases. However, it is very difficult for a user to directly search for the multimedia contents suited to his or her interests among various online multimedia contents that are available on a wide variety of platforms. In addition, as described above, due to the inconvenience of a user interface using a remote control, the user is unable to enjoy various online multimedia contents using a TV.

SUMMARY

An objective of the present disclosure is to provide an apparatus and a method for providing online multimedia contents, which can easily use various online multimedia contents through a TV channel selection method using a remote control.

Another objective of the disclosure is to provide an apparatus and a method for providing online multimedia contents, which can allow easy viewing of contents suitable for one's interest in various online User Created Contents.

According to an embodiment of the disclosure, in order to achieve the objectives above, an apparatus for providing online multimedia contents acquires, in a pre-designated manner, a content table address that stores a content table consisting of content addresses indicating locations where multimedia contents are stored online and content schedule times indicating playing times, and assigns the content table address to a designated channel; based on the content table address, acquires the content table; among the various content information of the content table, analyzes the information of the content corresponding the present time and acquires the content address where the multimedia content is stored; based on the content address, acquires the multimedia content online and outputs it through a TV.

The apparatus for providing online multimedia contents may acquire the content table address from a user command or by extracting it from an email or a message obtained through an email address or a messenger ID assigned to the TV.

The apparatus for providing online multimedia contents can obtain the content table address by filtering emails or messages containing a pre-designated password or transmitted from a pre-designated sender or a pre-designated server.

When an ID number is inputted in a pre-designated format, the apparatus for providing online multimedia contents can transmit the ID number to a pre-designated ID number mapping server and obtain the content table address corresponding to the ID number from the ID number mapping server.

The content table is composed of update version information and a plurality of content information, wherein each of the plurality of content information may include a content title (<title>), a content address (<internet address>), a start time (<start time>), an end time (<end time>), backward allowance that allows to select previous contents of the content table (<backward>), forward allowance that allows to select the next content (<forward>), option setting (<option>), and the like.

The content information may further include reference time information (<reference time>), which may be provided in the form of <reference time: UTC time><start time: 00:00> <end time: 00:00> <title: abc> <internet address: https://aaa.bbb.ccc><forward: Y/N> <backward: Y/N> <option: choice>.

The apparatus for providing online multimedia contents may calculate a time difference between a current time and a start time specified by the content information corresponding to the current time, and output the acquired multimedia content through the TV by considering the calculated time difference.

If the content table is delivered via email or message, the apparatus for providing online multimedia contents can map and store the email address or messenger ID to a designated channel.

The apparatus for providing online multimedia contents may display a pre-designated color for a pre-designated area of a multimedia content or an advertisement delivered together with the multimedia content, and when a color command corresponding to the displayed color is inputted from a remote control that has a plurality of colored buttons, convert the color command into a selection command for a pre-designated area of the multimedia content or the advertisement.

When an integrated content table where a plurality of content tables are integrated based on the content table address is obtained, the apparatus for providing online multimedia contents may map the plurality of content tables integrated in the integrated content table to a channel; and when a command to change the channels within the channel is inputted by pressing a channel-in-channel button on the remote control, where the channel-in-channel buttons are provided separately from the conventional channel change button, the apparatus for providing online multimedia contents obtains the content address of a multimedia content to be played at the current time by changing the content table among the plurality of content tables of the integrated content table.

The apparatus for providing online multimedia contents may include: an interface unit obtaining a user command by converting a signal transmitted through a remote control; a channel setting unit for mapping and storing the content table address to a pre-designated channel, and when the channel to which the content table address is mapped is selected, receiving and analyzing the content table according to the content table address, and obtaining the content address of the multimedia content to be played at the current time; a communication unit for obtaining the content table online based on the content table address, delivering it to the channel setting unit, and receiving the corresponding multimedia content based on the content address; and a content acquisition unit for obtaining the multimedia content through the communication unit, converting it into an image signal that can be outputted from a TV, and outputting the image signal.

According to another embodiment of the disclosure, in order to achieve the another objective above, a method for providing online multimedia contents is a method for providing online multimedia contents carried out by an apparatus for providing online multimedia contents, wherein the method comprises the steps of: acquiring, in a pre-designated manner, a content table address where a content table is stored, wherein the content table indicates locations where multimedia contents are stored online along with a plurality of content information with each set time to be played, mapping and storing the content table address to a designated channel; obtaining the content table based on the content table address; analyzing content information of the content table corresponding to the current time among the plurality of content information included in the content table to obtain a content address where the multimedia content is stored; and acquiring the multimedia content online based on the content address and outputting it through TV.

Accordingly, the apparatus and method for providing online multimedia contents according to the embodiment of the disclosure allows a TV user to easily view various multimedia contents available online by simply changing the channel buttons of the remote control, thereby maximizing the user convenience of online multimedia contents. In addition, since various multimedia content tables suited for one's interest are provided through various information delivery means such as web, mail, and message, and various multimedia contents can be played based on the content tables, users can easily watch multimedia contents through TV channel control operations.

DETAILED DESCRIPTION

Figure 1:
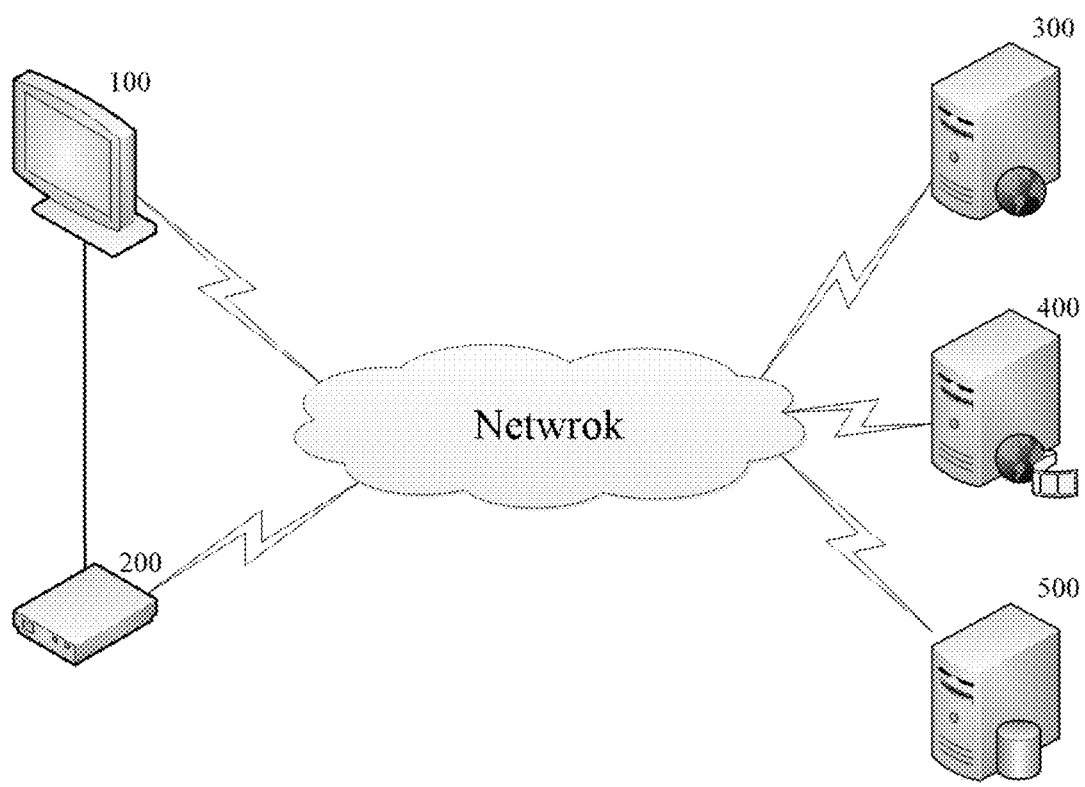
FIG. 1 shows a schematic configuration of an online multimedia content providing system according to an embodiment of the disclosure.

To sufficiently understand the present disclosure, its operational advantages, and the objectives achieved by practice of the disclosure, it is necessary to refer to the appended drawings that illustrate preferred embodiments of the disclosure as well as the descriptions provided for the appended drawings.

The present disclosure is described in detail below, through a description of preferred embodiments of the disclosure with reference to the accompanying drawings. However, the disclosure can be implemented in various different forms and is not limited to the described embodiments. For a clearer understanding of the disclosure, parts that are not of great relevance to the disclosure have been omitted, and reference numerals in the drawings are used to represent the corresponding elements.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

FIG. 1 shows a schematic configuration of an online multimedia content providing system according to an embodiment of the disclosure.

Referring to FIG. 1, an online multimedia content providing system according to this embodiment can include a TV 100 that outputs multimedia contents to a user; a set-top box 200 that acquires a web address (content table address) providing content tables for multimedia contents available online, maps the acquired content table address to a TV channel, obtains the content table from the content table server by accessing the content table address when the mapped channel is selected, acquires the corresponding multimedia content according to the content table and transmits it to the TV 100; a content table server 300 that provides content tables prepared in advance by a content editor; and a content server 400 that provides various multimedia contents.

In addition, the online multimedia content providing system may further include an ID number mapping server 500 that manages a database that maps and stores an ID number and a corresponding content table address. If the set-top box 200 transmits an arbitrary ID number, the ID number mapping server transmits the content table address corresponding to the ID number to the set-top box 200.

TV 100, as it is known, is the most popular video output device, and receives and outputs image signals from the set-top box 200.

The set-top box 200 is an online multimedia content providing device of the invention, receiving a multimedia content through a network, converting it into an image signal that can be used by the TV 100 and outputting the image signal. Here, the set-top box 200 may acquire multimedia contents provided for each channel by a pre-designated content provider, and transmit them to the TV 100, similar to the conventional set-top box for IPTV. In this case, the set-top box 200 may receive multimedia contents for each channel previously designated by a content provider. In other words, when a user selects a specific channel using a remote control, a multimedia content according to the selected channel may be provided through online from the content server 400 of the content provider and transmitted to the TV 100.

Also, like the conventional set-top boxes for OTT, when the multimedia contents previously designated by the content provider are listed in a pre-determined manner and the user operates the remote control to search for and select a specific multimedia content among the listed multimedia contents, the selected multimedia content may be provided from the content server 400 of the content provider and transmitted to the TV 100.

In the case of a set-top box for IPTV, although a variety of multimedia contents can be viewed through a very simple operation of selecting a channel, there is a limitation that specified multimedia contents can be viewed only at a specified time. On the other hand, in the case of a set-top box for OTT, there is an advantage that the user can directly select a specific multimedia content from among the listed multimedia contents so that the user can freely view the multimedia content at a desired time. However, there is inconvenience of having to select a specific multimedia content through repeated operation of the remote control among the plurality of listed multimedia contents, and in the case of multimedia contents that are not shown, they must be individually searched and selected by inputting characters using a remote control, which is a problem since inputting characters is inconvenient for the user compared to simple repetitive operations of the remote control. Moreover, the set-top box for OTT typically allows multimedia contents on a pre-designated specific platform to be listed or searched, and thus makes it difficult to view multimedia contents on various platforms, such as personally created contents, using a TV.

Hence, the set-top box 200 according to this embodiment is provided with a content table address that is a web address where a content table is stored, which contains content addresses for a plurality of multimedia contents regardless of the platform, and maps the provided content table address to a channel, thereby allowing users to conveniently use a variety of multimedia contents available on multiple platforms, such as personally created contents, only by selecting a channel.

The set-top box 200 of this embodiment, if specified conditions are satisfied, such as selecting the channel mapped to the content table address by remote control operation, or the like, accesses a location that provides the multimedia content online, using the content address for each multimedia content based on the content table obtained by accessing the content table address, and delivers the multimedia content to the TV 100. Therefore, it is possible for the user to easily view various multimedia contents on the TV 100 regardless of the platform.

Here, the set-top box 200 may update the content table in various ways. As an example, the set-top box 200 may update the content table by accessing the content table address according to a user command or a pre-designated period. In other words, if the content table address is already mapped to a specific channel, the set-top box 200 may access the designated content table address, check whether a newly created content table exists, and update it at the designated time every day or when the channel is selected.

The set-top box 200 can access a content table address according to the input by a user by operating the remote control or the like. In addition, the set-top box 200 can obtain a content table address by using emails or various messages or a pre-designated ID number, and map it to a specific channel. In some cases, the set-top box 200 may directly receive and update a content table through emails or various messages.

In FIG. 1, the TV 100 and the set-top box 200 are separately illustrated for the convenience of explanation. However in some cases, such as smart TV, the set-top box 200 may be integrated into the TV 100.

Detailed functions and configurations of the set-top box 200 will be described in detail below.

The content table server 300 stores at least one previously created content table, and, when at least one set-top box 200 accesses the content table server 300 based on the content table address, transmits the content table to the set-top box 200. Here, if a plurality of content tables are stored in the content table server 300, a different content table address may be assigned to each of the plurality of content tables. In addition, the content table server 300 may transmit to the set-top box 200 a content table corresponding to a content table address to which the set-top box 200 accesses among the plurality of content table addresses.

In addition, the content table server 300 may periodically transmit the content table to the set-top box 200 through an email or a messenger or the like. Also, the delivery method can be switched from web access to email delivery, or from email delivery to web access, as needed.

Here, the content table server 300 may transmit the content table when the set-top box 200 accesses a pre-designated content table address online and requests the content table. However, even if there is no request from the set-top box 200, it may be set to transmit the content table to the pre-designated set-top box 200 at a pre-designated time.

In addition, the content table server 300 may be set to transmit the content table address to the set-top box 200 via a pre-designated email address or messenger ID or the like. In other words, the content table server 300 may transmit the content table address as illustrated in Example 1 below to the set-top box 200 by using an email address or a messenger ID or the like, which is assigned to the set-top box 200:

(Example 1) aaa.com/table.txt

The set-top box 200, when receiving the text of (Example 1), maps the content table address "aaa.com/table.txt" to a channel designated by the user or an available channel.

Meanwhile, as illustrated in (Example 2), the content table server 300 may transmit a channel number together with the content table address to the set-top box 200:

(Example 2) aaa.com/table.txt 36

The set-top box 200, when receiving a text that includes the content table address and the channel number as illustrated in (Example 2), maps the content table address "aaa.com/table.txt" to channel 36.

In addition, when a user's acquaintance or the like transmits an email or a message including a content table address as illustrated in (Example 1), the set-top box 200 may receive the email or message and process it in the same manner. In this case, of course, security means is required to avoid unauthorized access.

The content table can be created by a content editor, and the content editor can create the content table by collecting content addresses of multimedia contents provided through various online platforms and making a content table according to a pre-designated format by including content information for each of a plurality of multimedia contents based on the collected content addresses.

Here, the content table may include content information for each of a plurality of multimedia contents in the form of a list, wherein each content information may include, for example, information such as an update version (<version>) of the content table, content title (<Title>), content address (<internet address>), start time (<start time>), and end time (<end time>) for each multimedia content, whether to allow forward and backward operations (<forward: Y/N> <backward: Y/N>), and other option settings (<option>), etc., according to a pre-designated format.

In addition, the content table may further include date (<date>) and reference time (<reference time>) information such that the time difference for each time zone can be taken into account due to the nature of the content provided online, and accordingly, the content table may be provided in the form as illustrated in (Example 3) below:

(Example 3) [It can be provided in the following form]
    <date: 0000:00:00> <reference time: UTC time> <start time: 00:00> <end time: 00:00> <title: abc> <internet address: https://aaa.bbb.ccc> <forward: Y/N>310<backward: Y/N> <option: choice>.

The update version represents a version of the content table and may be expressed as a simple number, but may also be expressed as the date and time the content table was created. The content title (<Title>) represents the title of the multimedia content, the content address (<internet address>) represents the online address where the multimedia content is available, and the start time (<start time>) and the end time (<end time>) represents the playback start time and end time of the multimedia content when the corresponding channel is selected. In the case of most online multimedia contents, especially personally created contents, unlike terrestrial broadcasting or cable broadcasting or the like that collectively transmit the specified content at a specified time, it can be configured to transmit the corresponding multimedia content to a user terminal or set-top box only when a request for the content is authorized from the user terminal or set-top box. On the contrary, in this embodiment, since the start time and end time for each multimedia content to be played are already designated in the content table, the set-top box 200 may request and play the corresponding multimedia content based on the current time, even if the user does not separately request it. In other words, when a user selects a channel to which a content table is designated through a channel change operation of the remote control, the multimedia content corresponding to the current time may be automatically acquired and transmitted to the TV 100. In other words, since the same content can be viewed at the same time, viewing information can be easily shared between viewers.

Therefore, it allows a user to sequentially enjoy multiple online multimedia contents just with a simple channel change operation using a remote control without separately searching for online multimedia contents.

At this time, when the user selects the channel to which the content table is mapped, the set-top box 200 may also calculate a time difference between the current time and the start time designated in the content table and reflect the calculated time difference so that the multimedia content is played from a specific time. However, in some cases, considering the characteristics of the online multimedia content, the multimedia content can be played from the start of the multimedia content corresponding to the current time when the channel is selected. In this case, it is also possible to sequentially delay the start and end times of the multimedia content scheduled to a later time in the content table.

Whether to allow forward and backward (<forward: Y/N> <backward: Y/N>) operations also depends on the characteristics of online multimedia contents, and this functionality allows the user to freely select a content designated to be played before or after the multimedia content currently being played in the content table, using a remote control or the like. Here, whether to allow forward and backward (<forward: Y/N>, <backward: Y/N>) operations is optional because some online multimedia contents may be broadcast in real-time or are allowed to be transmitted only during a specific time period. If forward and backward operations are not allowed, all viewers will watch the same content at the same time.

The option setting (<option>) is an additional item to allow the user to manipulate the playback state of the multimedia content of the content table, and can be set in various ways. For example, information such as content rating information, selectable languages or the like can be provided.

The content table server 300 in this embodiment may be a server solely dedicated to provide the content table. However, any devices capable of providing a content table to a specific online address may be used as the content table server 300. In addition, the content editor may also be any individual who can upload a content table to an arbitrary online address, and in some cases, may be the user of the set-top box 200.

Since any individual can become a content editor, to create a content table, the content editor can not only collect multimedia contents focused on specific fields such as sports, entertainment, and IT among various online multimedia contents available in a wide variety of fields, but also create a variety of specialized content tables for specific items that are highly subdivided within each field. In addition, the user of the set-top box 200 can use the latest multimedia contents for a specific item by setting the set-top box 200 to receive a content table provided by a specialized content editor and play them through a mapped channel without directly searching for multimedia contents that suits one's interest among the vast amount of multimedia contents.

The content server 400 stores a plurality of multimedia contents, and when at least one set-top box 200 accesses it based on a content address designated in a content table, transmits the stored multimedia contents to the set-top box 200. In this case, the content server 400 may transmit the multimedia content to the set-top box 200 in a streaming manner, in order to reduce traffic that may be generated by content requests from multiple set-top boxes 200.

The content server 400 may also be a solely dedicated server like the content table server 300, but any device capable of transmitting a multimedia content to a specific online address may be used as the content server 400.

When the set-top box 200 transmits a specific ID number according to a pre-designated method, the ID number mapping server 500 transmits the content table address, which is the web address of the content table corresponding to the specific ID number, to the set-top box 200. In other words, the ID number mapping server 500 maps a specific content table address to a specific ID number, and transmits the content table address corresponding to the specific ID number to the set-top box 200 upon the request of the set-top box 200.

As described above, the content table server 300 may store a plurality of content tables depending on the case, and a web address (content table address) may be assigned to each of the plurality of content tables. In this case, the ID number mapping server 500 may transmit a web address corresponding to an ID number among a plurality of web addresses. In addition, the ID number mapping server 500 performs tasks such as allocating an ID number and maintenance, which are necessary for this kind of task.

In the above, although the content table server 300 and the content server 400 are shown as separate servers, the content table server 300 and the content server 400 may be integrated into one server.

Figure 2:
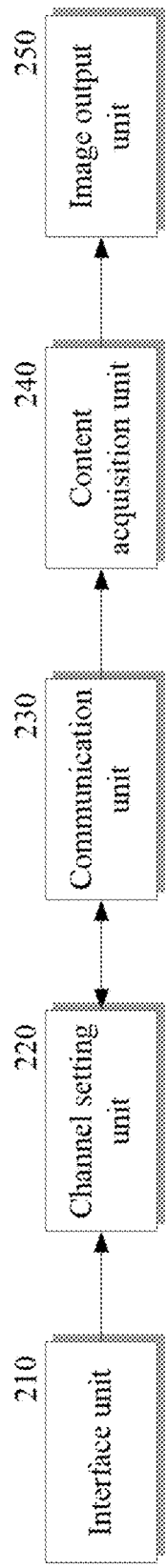
FIG. 2 shows an example of the apparatus for providing online multimedia contents shown in FIG. 1.
Figures 3, 4:
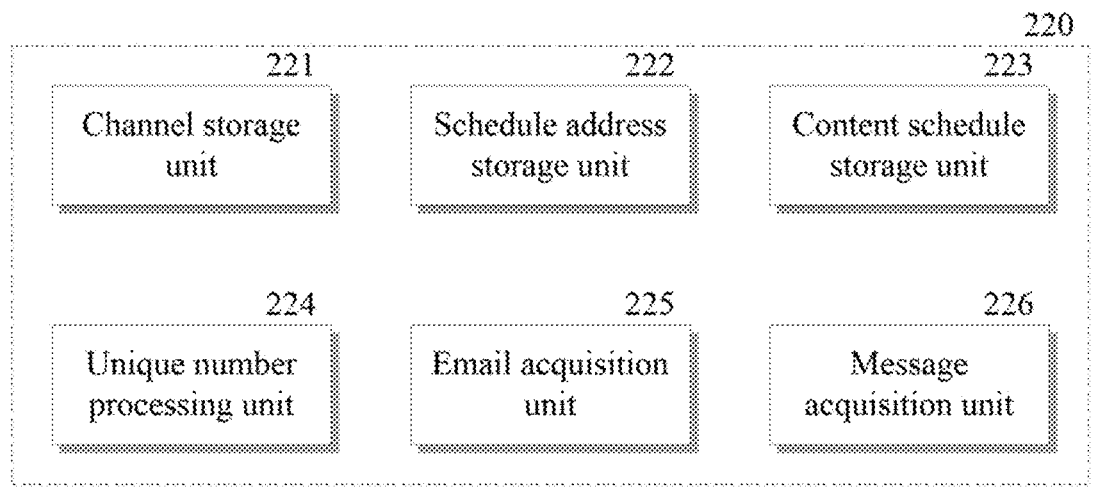
FIG. 3 shows an example of a content table address transmitted in the form of an email or a message.
FIG. 4 shows an example of a configuration of a channel setting unit of FIG. 2.

FIG. 2 shows an example of the apparatus for providing online multimedia contents shown in FIG. 1 and FIG. 3 shows an example of content table addresses transmitted in the form of an email or message.

As described above, the apparatus for providing online multimedia contents of the invention is the set-top box 200 shown in FIG. 1 and the apparatus for providing online multimedia contents may include, as shown in FIG. 2, an interface unit 210, a channel setting unit 220, a communication unit 230, a content acquisition unit 240, and an image output unit 250.

The interface unit 210 detects a signal input through a user input means such as a remote control (not shown), converts it into a user command, and transmits it to the channel setting unit 220. The interface unit 210 may be implemented, for example, as a detection sensor that detects a wireless signal such as infrared or RF signals transmitted from the remote control, and may convert and transfer a wireless signal transmitted from the remote control into a user command in a pre-designated manner.

When the content table address is provided, the channel setting unit 220 maps and stores the provided content table address to a channel that is pre-designated or designated by a user. In some cases, the channel setting unit 220 may acquire a content table address based on pre-stored user information, even if the content table address is not provided, and map and store the acquired content table address to a designated channel. Here, the user information may be an email address, a messenger ID, and the like assigned to the set-top box 200 by the user.

In addition, when the user inputs a specific ID number, the channel setting unit 220 may transmit the ID number to the pre-designated ID number mapping server 500, and receive a content table address corresponding to the ID number from the ID number mapping server 500. Here, the ID number may be, for example, a phone number of a content editor who operates a content table server. The user may input the ID number by using number buttons on a remote control or the like.

In addition, the channel setting unit 220 may select, according to a user command inputted through the interface unit 210, a channel to be mapped to the content table address. For example, when a channel setting command is inputted as a user command, the channel setting unit 220 may select one of available channels that can be designated in response to the inputted channel setting command. When a channel number is additionally inputted to the channel setting command, the channel setting unit 220 may use the inputted channel number to which the content table address is to be mapped. Meanwhile, the channel setting unit 220 may obtain a content table by accessing the content table server 300 using the acquired content table address through the communication unit 230.

For example, when a channel change command or a channel selection command is inputted through the interface unit 210, the channel setting unit 220 may check the content table address mapped to the changed or selected channel, and access the content table server 300 in which the content table is stored through the communication unit 230 according to the content table address. In addition, the channel setting unit 220 may receive and store a content table from the content table server 300. Periodically or when a channel to which the content table address is mapped is selected, the channel setting unit 220 may access the content table server 300 to check whether the content table is updated and perform the update. In this case, the update of the content table may be performed according to the update version (<version>) included in the content table.

In addition, the channel setting unit 220 may directly receive an email or message including a content table, extract the content table from the received email or message, and map it to a specific channel. In other words, for users who are unfamiliar with the mapping operation, it is possible to map the content table address to a specific channel by sending a specific message through the email or message address assigned to the set-top box.

As an example, the channel setting unit 220, when receiving an email or a message as shown in FIG. 3, maps "aaa.com/table.txt" to channel 36, "bbb.com/table.txt" to channel 37, and "ccc.com/table.txt" to channel 38. The PWD is a password field, and the channel setting unit 220 may prevent unauthorized channel mapping by performing a channel mapping operation only when the correct password is inputted. In addition, when the user is not familiar with device operation, the channel mapping operation may be performed through an email or a message transmitted by an acquaintance or the like of the user. In FIG. 3, it can be seen that the email or message recommends designating the three content table addresses to channels 36, 37, and 38. However, if it is determined that the channel designated in the email or message is already in use, a notification window may be shown on the TV so that the user can select or replace it with another channel.

When the content table is obtained, the channel setting unit 220 analyzes the content information corresponding to the current time of the content table corresponding to the currently selected channel to obtain a content address, and accesses the content server 400 through the communication unit 230 using the obtained content address to acquire the multimedia content. The channel setting unit 220 may acquire the multimedia content from a specific time by reflecting a time difference between the current time and the start time designated in the content information in the content table.

In addition, when a forward or backward command is inputted through the interface unit 210, the channel setting unit 220 may play the content before or after the current time in the content table.

When the content table address is transmitted from the channel setting unit 220, the communication unit 230 may access the content table server 300 according to the transmitted content table address to obtain the content table.

However, if an ID number other than the content table address is inputted, it may obtain a content table address corresponding to the ID number by accessing the pre-designated ID number mapping server 500, and obtain the content table by accessing the corresponding content table server according to the obtained content table address. In addition, when the content address is transmitted, the communication unit 230 accesses the content server 400 corresponding to the content address to receive the corresponding multimedia content. Meanwhile, the communication unit 230 may receive an email or a message based on the pre-designated email address or messenger ID information.

When the multimedia content is acquired through the communication unit 230, the content acquisition unit 240 stores the acquired multimedia content. As described above, a multimedia content may be transmitted in various ways such as streaming. Thus, buffering may be required to ensure that the multimedia content is stably outputted from the TV without interruption. Accordingly, the content acquisition unit 240 temporarily stores the multimedia content transmitted from the content server 400 and delivers the stored multimedia content to the image output unit 250 in a designated manner.

In addition, when a command such as fast forward or rewind operation is inputted from the interface unit 210, the content acquisition unit 240 may deliver the multimedia content at a corresponding time point to the image output unit 250 by adjusting the playback position of the currently playing multimedia content. When a request for a location other than the currently stored location is inputted, it may re-request the multimedia content at the corresponding location from the content server 400 through the communication unit 230, so that it can receive the corresponding multimedia content from the requested location and transmit it to the image output unit 250.

The image output unit 250 converts the multimedia content transmitted from the content acquisition unit 240 into an image signal that can be outputted by the TV 100 and transmits it to the TV 100. However, as described above, when the set-top box 200 is integrated with the TV 100, the image output unit 250 may be implemented as a display device.

In the above, for convenience of understanding, the content acquisition unit 240 and the image output unit 250 have been separately described. However, the image output unit 250 may be integrated into the content acquisition unit 240.

FIG. 4 shows an example of a configuration of a channel setting unit of FIG. 2. Referring to FIG. 4, the channel setting unit 220 may include a channel storage unit 221, a content table address storage unit 222, a content table storage unit 223, an ID number processing unit 224, an email acquisition unit 225, and a message acquisition unit 226.

When a channel setting command is inputted from the interface unit 210, the channel storage unit 221 selects one of a plurality of channels and stores the content table address to it in response to the channel setting command. At this time, when the channel number is inputted, the channel storage unit 221 may map the content table address to the inputted channel number. If the channel number is not inputted, the channel storage unit 221 may select one of the available channels except for the previously mapped channels. In addition, when a channel setting command is inputted, the channel storage unit 221 may transmit the currently available channel numbers to the image output unit 250 and displays them for the user, so that the user can select one of the available channel numbers that do not overlap with the channels already used. In other words, the user can directly select a channel for viewing the multimedia content online according to the content table.

However, in some cases, the content editor may provide the content table address together with a recommended channel number through an ID number, an email or a messenger. In this case, the channel storage unit 221 may store the content table address in the recommended channel number obtained from the ID number processing unit 224, the email acquisition unit 225, or the message acquisition unit 226.

The content table address storage unit 222 stores the content table address where the content table is available. The content table address storage unit 222 may receive and store the content table address from the interface unit 210; or may obtain the content table address from one of the ID number processing unit 224, the email acquisition unit 225, and the message acquisition unit 226, and store it together with mapped channel information.

In addition, the content table address storage unit 222 may map and store the content table address to the mapped channel. Thus, when a specific channel is selected, the corresponding content table address is checked and the content table may be requested. In addition, the content table address storage unit 222 may also check the content table address at a pre-designated period and request the latest content table.

The content table storage unit 223 stores the content table that is received from the content table server 300 by the content table address storage unit 222 that accesses the content table address. The content table storage unit 223 may map and store the content table to a content table address or a channel. Then, when the mapped channel is selected, it checks the content information corresponding to the current time by analyzing the content table, and requests the multimedia content according to the content address included in the content information. Here, as described above, the content table storage unit 223 may request the multimedia content by considering the time difference between the current time and the start time of the multimedia content designated in the content information.

The ID number processing unit 224, the email acquisition unit 225, and the message acquisition unit 226 are user authentication units. Even if the user does not separately enter the content table address, they can authenticate the user based on the pre-set user information and thereby allow the user to easily obtain the content table address.

When an ID number (for example, a phone number or the like) is inputted from the interface unit 210, the ID number processing unit 224 delivers the ID number to the pre-designated ID number mapping server 500, and requests the content table address corresponding to the corresponding ID number. In addition, the content table address provided from the ID number mapping server 500 is stored in the content table address storage unit 222.

The email acquisition unit 225 may receive an email based on the pre-set email address, extract the content table address from the received email, and transfer it to the content table address storage unit 222. At this time, the email acquisition unit 225 may perform authentication such that only authorized emails can be selected from among a plurality of emails received through an assigned email address. In addition, as the email authentication method, password setting, a specific mail address designation method, or the like can be used. In other words, it is possible to filter out various spam emails or the like and use only an email that contains an authorized content table address by checking whether a specific password is included in a designated location (e.g., mail title) and the like, or whether the sender of the received mail has been authorized in advance. For example, it is also possible to authorize a mail server or an email address that is allowed to transmit the content table address in advance. Then, the email acquisition unit 225 can extract the content table address only from the emails transmitted by the authorized mail server or the authorized email sender. In particular, when configured to use only emails sent from an authorized sender, it can allow a specific group to easily share and use common multimedia contents.

Meanwhile, the email acquisition unit 225 may also receive an email containing a content table instead of the content table address. In this case, the email acquisition unit 225 may extract the content table from the email and transfer it to the content table storage unit 223.

The message acquisition unit 226, similarly to the email acquisition unit 225, may receive a message based on a pre-set messenger identifier, extract the content table address or content table from the received message, and transfer it to the content table address storage unit 222 or the content table storage unit 223. In addition, the message acquisition unit 226 also may use a password and pre-designate an allowed message sender in order to filter out unauthorized messages.

As a result, when a content editor creates a content table based on the content addresses of multimedia contents available on various platforms online, the online multimedia content providing system according to this embodiment accesses, according to the content table address, the uploaded content table or acquire it by means of an ID number, email and message, and the like; and acquire the multimedia content according to the content table obtained from the mapped channel so that the multimedia content can be played on the TV. Accordingly, by mapping a specific channel to the content table address where the content table created by a content editor was uploaded, which is deemed suitable for the user, the user can enjoy multimedia contents in the field of interest by simply operating the channel change or the channel selection operations without the need to directly search for them.

Figure 5:
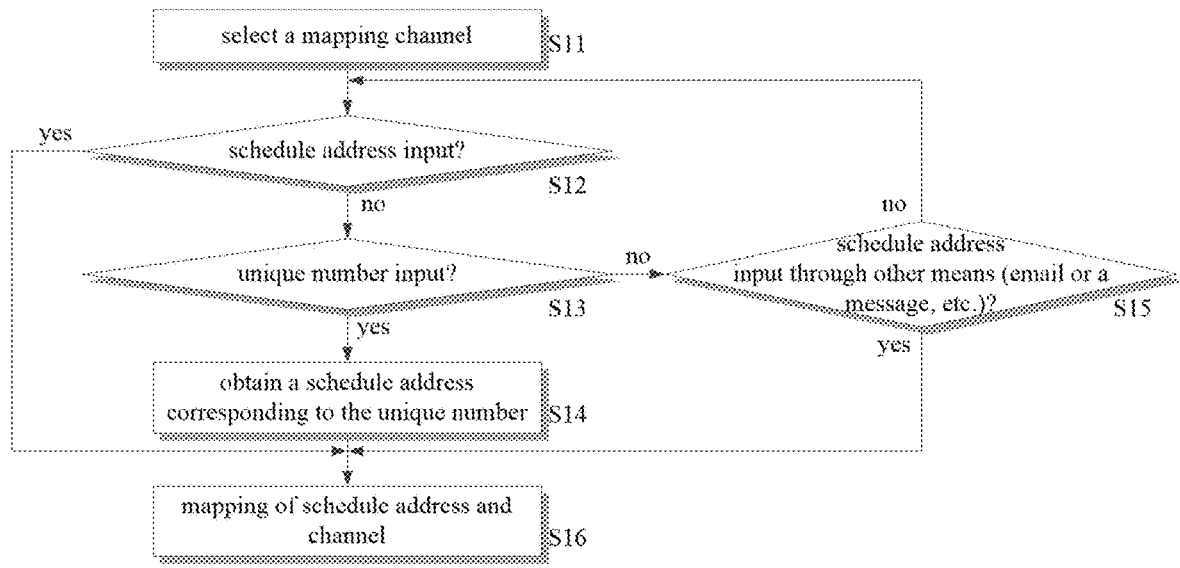
FIG. 5 shows a method for providing online multimedia contents according to an embodiment of the disclosure.

FIG. 5 shows a method for providing online multimedia contents according to an embodiment of the disclosure.

FIG. 5 is a process of mapping a content table address to a channel in the method for providing online multimedia contents of the embodiment. Referring to FIG. 1 to FIG. 4, the process of mapping a content table address to a channel in the method for providing online multimedia contents of FIG. 5 comprises the first step of selecting one of a plurality of channels which can be designated as a mapped channel (S11). Here, the mapped channel may be selected by inputting a channel setting command among user commands, and may also be selected by acquiring mapped channel information through an email or message transmitted based on an email address or a messenger ID received according to pre-set user information. Then, it is examined whether the content table address in which the content table is stored is inputted (S12). If the content table address is inputted, the inputted content table address is mapped and stored to the selected channel (S16). However, if the content table address is not inputted, it is examined whether an ID number is inputted (S13). If an ID number is inputted, the inputted ID number is transmitted to the pre-designated ID number mapping server 500 to obtain the content table address corresponding to the ID number (S14). On the other hand, if the ID number is not inputted, it is examined whether the content table address is inputted through other means such as an email or a message or the like (S15). If the content table address was inputted by other means such as an e-mail or a message or the like, the inputted content table address is mapped and stored to the selected channel (S16).

Figure 6:
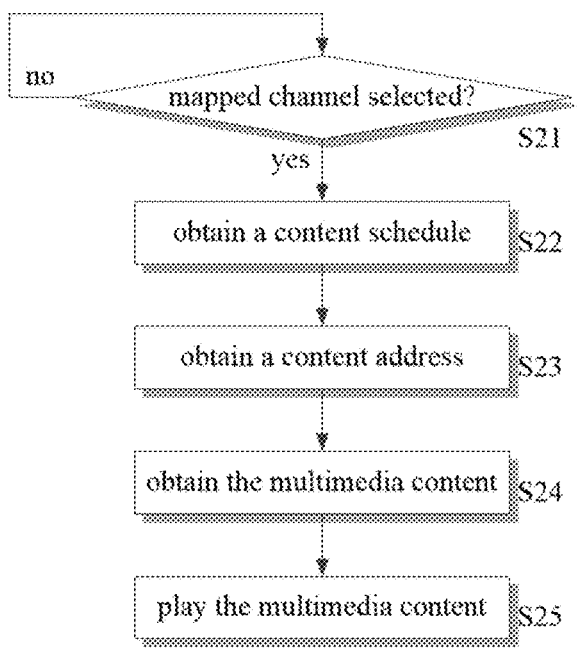
FIG. 6 shows a method of playing a content of the channel mapped to the content table address.

FIG. 6 shows a process of playing a content of the channel mapped to the content table address.

Referring to FIG. 6, it is examined whether a mapped channel is selected (S21). If it is determined that the mapped channel is selected, a content table is obtained, which consists of content information including a content address in which a multimedia content to be played at a given time is stored, by accessing the content table server 300 according to the content table address mapped and stored to the selected channel (S22). On the other hand, if a content table is directly included in an already transmitted email or message, the content table may be extracted from the email or message and mapped to a specific channel. In other words, the content table may be already stored in association with a mapped channel.

When the content table is obtained, content information corresponding to the current time is checked in the content table so that a content address is obtained in which the multimedia content to be played is stored (S23). Then, based on the obtained content address, the corresponding multimedia content is obtained from the content server 400 in which the multimedia content is stored (S24). Thereafter, the obtained multimedia content is transmitted to the TV 100 so that the obtained multimedia content is played on the TV 100 (S25).

Meanwhile, in the case of a content table provider with limited resources, it may be difficult to operate an independent content table server. In this case, the content table provider can provide the content table to the user through an email or a messenger, etc.

If a content table is provided through an email or a messenger as described above, the set-top box may directly map an email address or a messenger ID to a channel instead of mapping the content table server address to a specific channel. For example, if an email address or a messenger ID of a content table provider is mapped to a specific channel, a content table is extracted from the email or message received from the email address or messenger ID mapped to the channel and stored in association with the corresponding channel. The content table provider that provides the content table using an email or a messenger periodically can send the content table to the subscribed set-top box, and the set-top box associates and stores the received content table to a specific channel based on the email address/messenger ID.

Figure 7:
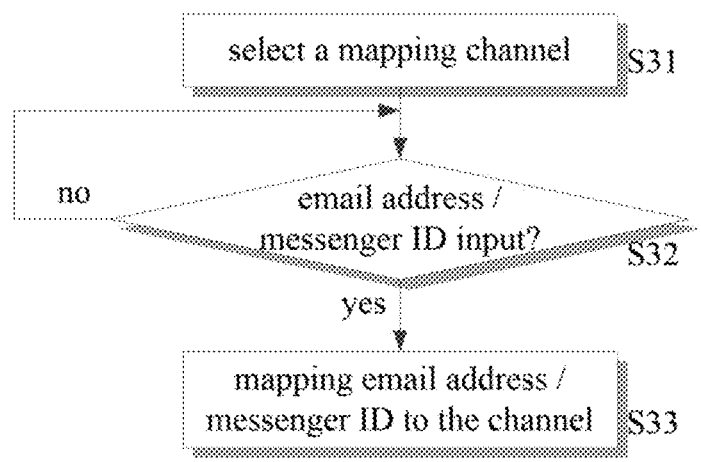
FIG. 7 shows a method of mapping an email address or a messenger ID to a channel.

FIG. 7 shows a process of mapping an email address or a messenger ID to a channel.

Referring to FIG. 7, one of a plurality of channels is selected as a mapped channel (S31). Then, it is examined whether an email address or a messenger ID to be stored in association with the mapped channel is inputted (S32). If an email address or a messenger ID is inputted, the input email address or messenger ID is mapped to the selected channel (S33). Mapping an email address or a messenger ID to a selected channel can also be performed via email or message.

As an example, if an email is received, which includes the password of "YS3838392 #12" and the email address of "aaa@bbb.ccc" as illustrated in (Example 4), the email address may be mapped to channel 36.

(Example 4)
PWD: YS3838392 #12
aaa@bbb.ccc 36

In addition, if a message as shown in (Example 5) is received, the messenger ID
"MESSENGER_ID" may be mapped to channel 37.
(Example 5)
PWD: YS3838392 #12
MESSENGER_ID 37

As a result, according to the channel mapping process of FIG. 7, in this embodiment, an email address or a messenger ID or the like of a content editor providing the content table may be directly mapped to a channel instead of the web address of the content table. In this case, the content table provider may periodically send the content table to the user through email or messenger. With this method, it is possible to easily provide the content table to a number of users. In other words, the content table address may be a web address (Internet address, IP address, etc.) of the content table, or an email address or a messenger ID of a content editor.

Figure 8:
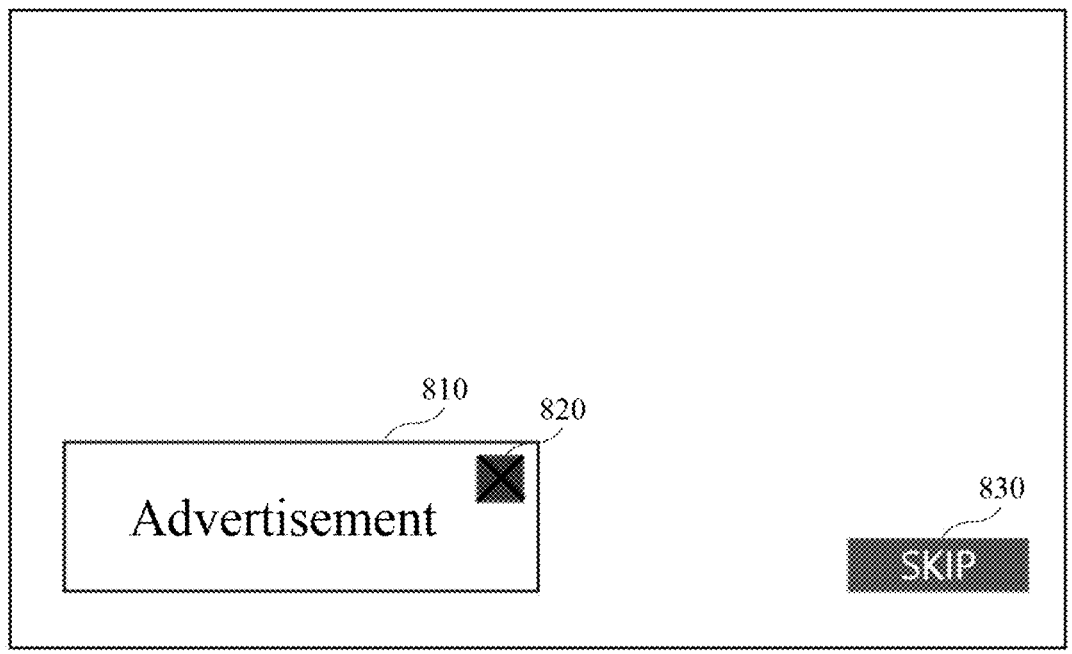
FIG. 8 to FIG. 10 are diagrams for explaining a content and advertisement control technique using color-based selection buttons on a remote control.
Figure 9:
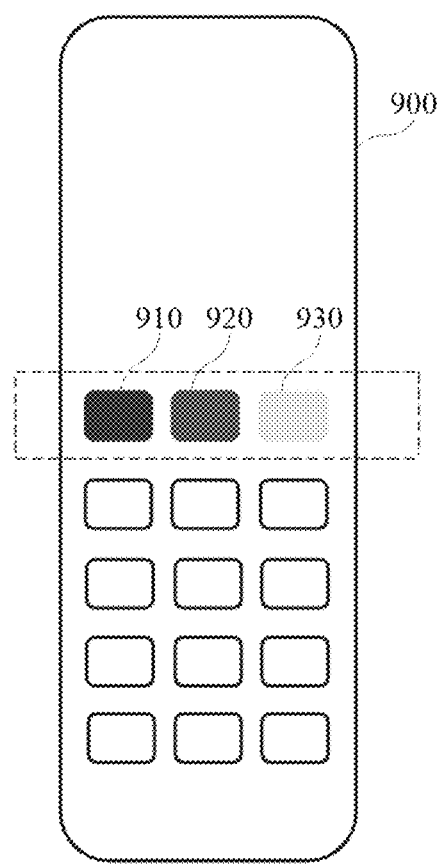
Figure 10:
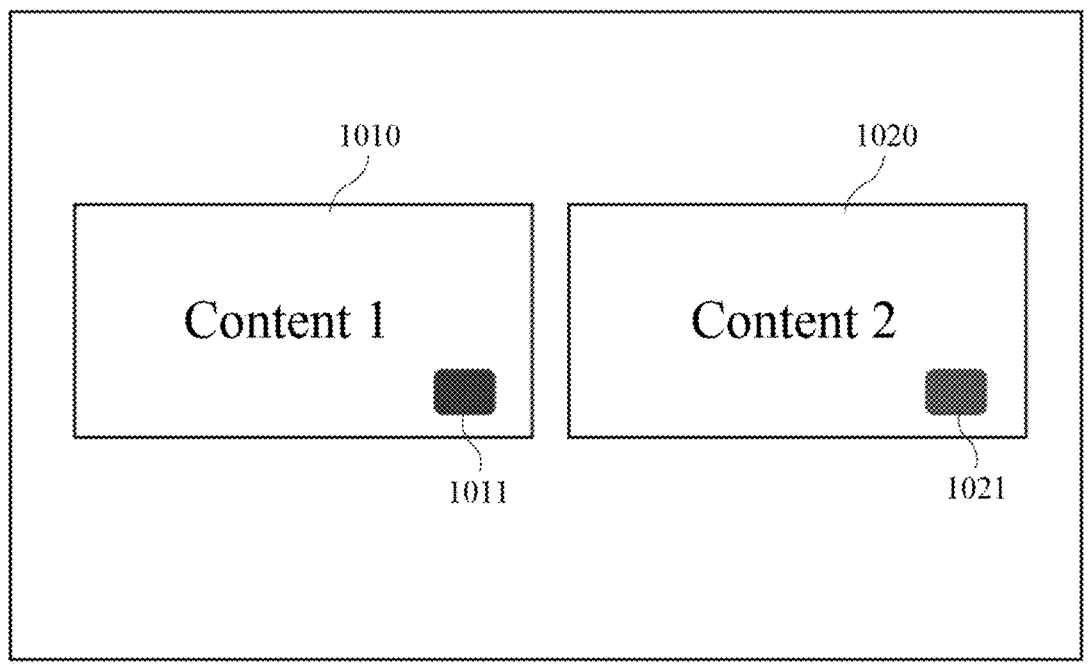

FIG. 8 to FIG. 10 are diagrams for explaining content and advertisement control techniques using color-based selection buttons on a remote control.

In some cases of online contents, advertisements are displayed before or after the content is played. In addition, in some cases, advertisements are displayed simultaneously while the content is being played. Particularly, in the case of some advertisements, the advertisement 810 is displayed in an overlapping manner on the content being played. Most of these advertisements 810 act as a major annoyance to viewer's immersion in the content.

However, most of the advertisements 810 shown together with online contents are provided with a terminate button 820 or a skip button 830, as shown in FIG. 8, so that the user can terminate or skip the advertisement 810. When a user views the online content through a computer or a smartphone or the like, the viewer can easily select the terminate button 820 or the skip button 830 by using a mouse or a touch screen. However, when viewing the online content through a TV, it is relatively difficult to select the terminate button 820 or the skip button 830. Accordingly, in the online multimedia content providing system according to the present embodiment, when an advertisement is transmitted before/after the content or during the content playback, the set-top box examines whether an terminate button 820 or a skip button 830 is displayed on the transmitted advertisement. If it is determined that the terminate button 820 or the skip button 830 is displayed, then the set-top box can detect the terminate button 820 or the skip button 830, display the area where the terminate button 820 or the skip button 830 is displayed using a pre-designated specific color and output it through TV.

On the other hand, as shown in FIG. 9, a plurality of color buttons 910 to 930 with pre-designated different colors are provided on the remote control 900 for the set-top box according to the present embodiment. When at least one color button among the plurality of color buttons 910 to 930 is selected by the user, the remote control 900 transmits a color command corresponding to the selected color button to the set-top box.

The set-top box examines whether the color command transmitted from the remote control 900 matches the color displayed in the terminate button or skip button area. If it is determined that it is the matching color command, the set-top box converts the color command into a selection command for the terminate button 820 or the skip button 830, and transmits it to the content server 400. In this case, the set-top box may convert the color command into a selection command according to a pre-designated standard and transmit it to the content server 400. Then, the content server 400 terminates or skips the advertisement according to the selection command transmitted from the set-top box.

For example, if red color is assigned to the advertisement terminate button 820 and blue color is assigned to the skip button 830, the user can terminate or skip the advertisement by selecting the red button 910 or the blue button 920 on the remote control 900 of FIG. 9.

In other words, the user can very easily terminate or skip the advertisement by pressing a color button on the remote control 900, which matches the color of the terminate button 820 or the skip button 830 displayed together with the advertisement on the TV and be immersed in enjoying the online multimedia content.

On the other hand, during content playback or after playback of online multimedia contents, one or more content selection images 1010, 1020 linked to other content addresses may be displayed as shown in FIG. 10 so that another content can be immediately selected and played. Such content selection images 1010 and 1020 can also be easily selected using various input interface means such as a mouse or a touch screen or the like in a computer or a smart phone or the like. However, it is difficult to make a selection using a conventional remote control. However, in the present embodiment, as shown in FIG. 10, the set-top box can display pre-designated specific color areas 1011 and 1021 at certain locations of the content selection images 1010 and 1020. Then, when at least one color button is selected among a plurality of color buttons 910 to 930 of the remote control 900 by the user and the color command is transmitted, the set-top box examines whether the transmitted color command matches the color displayed in the content selection images 1010 and 1020. If it is determined that the color command matches the color of a content selection image, the set-top box converts the color command into a content selection command and transmit it to the content server 400. Accordingly, the content server 400 transmits the selected content to the set-top box, which then plays the content.

In other words, the color buttons on the remote control allow convenient selection of terminate and skip of advertisements, or convenient selection of recommended contents.

Figure 11:
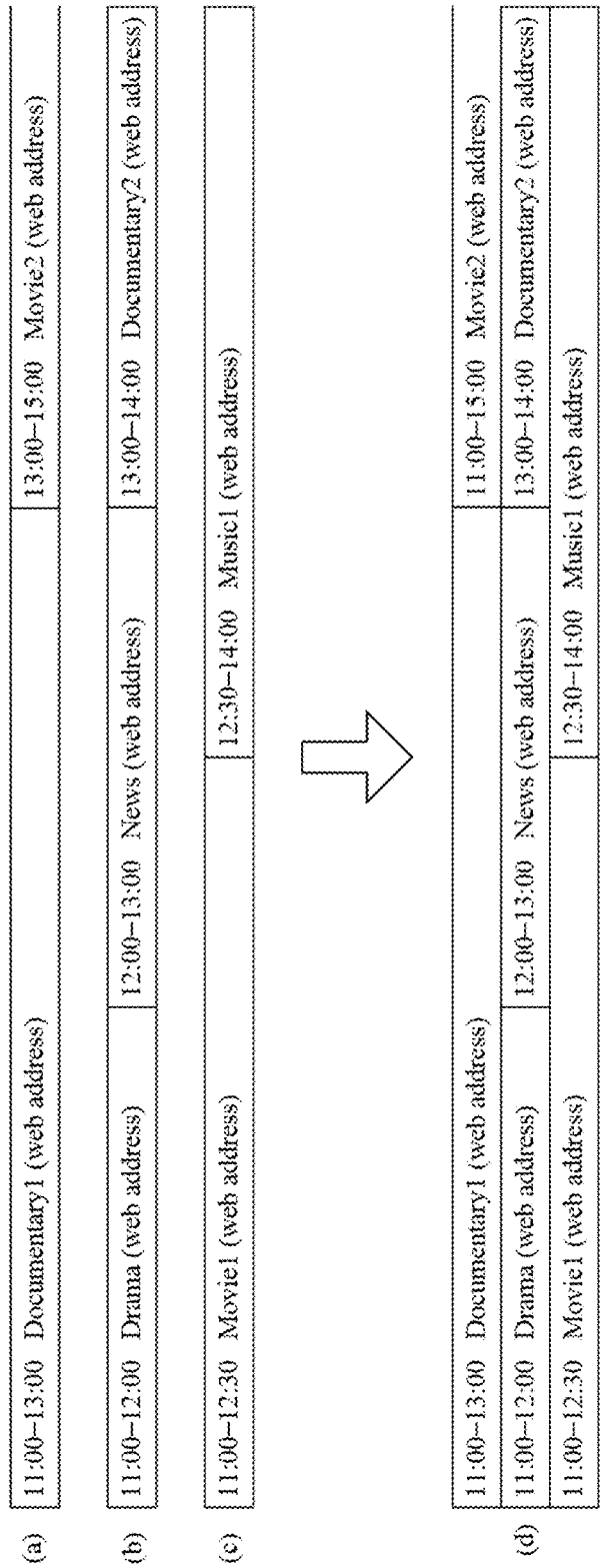
FIG. 11 and FIG. 12 are diagrams for explaining a channel-in-channel setting technique for a plurality of content tables.
Figure 12:
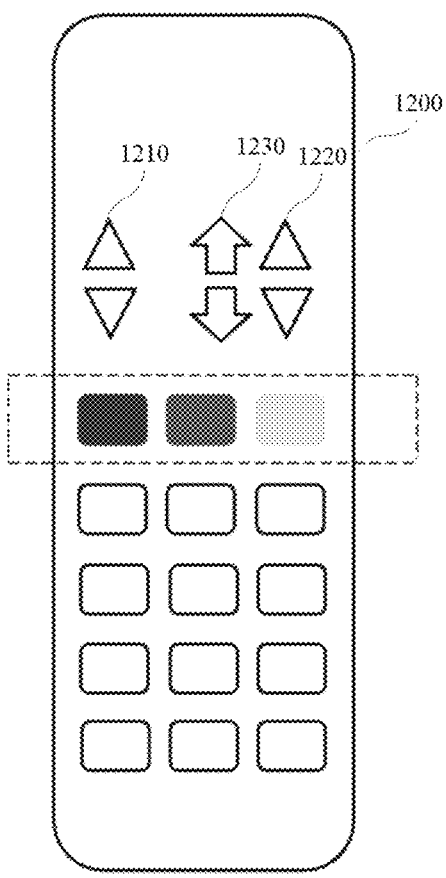

FIG. 11 and FIG. 12 are diagrams for explaining a channel-in-channel setting technique for a plurality of content tables.

The content editor may provide a plurality of content tables as shown in FIG. 11 (a) to (c) instead of a single schedule. When a single content editor provides a plurality of content tables, it is preferable that the plurality of content tables are consecutively assigned to a plurality of channels adjacent to each other. However, it is often difficult to use a plurality of adjacent channels due to previously assigned channels. In addition, in case of assigning different channels to each of a plurality of content tables, the channel usage convenience may decrease.

Accordingly, the content editor can provide an integrated content table by integrating a plurality of content tables as shown in (d). Then, the set-top box can map one channel to the integrated content table. In other words, one channel is assigned to the integrated content table where a number of content tables are integrated. In this case, since only one channel is assigned to the integrated content table, the channel usage convenience is improved. However, the user must be able to select contents from the integrated content table that contains a plurality of content tables within the assigned channel.

Accordingly, in this embodiment, as shown in FIG. 12, in addition to the existing volume buttons 1210 and channel buttons 1220, channel-in-channel buttons 1230 are additionally provided on the remote control 1200 so that the user can easily select and view the contents of a plurality of content tables integrated into an integrated content table by using the channel-in-channel buttons 1230.

As shown in FIG. 12, the channel-in-channel buttons 1230, like the volume buttons 1210 or the channel buttons 1220, may be composed of two buttons, an up-button and a down-button so that the user can select contents of different content tables included in the integrated content table by operating the up-button and the down-button of the channel-in-channel buttons 1230. In this case, the channel-in-channel shift operation can be implemented through a general user interface.

Figure 13:
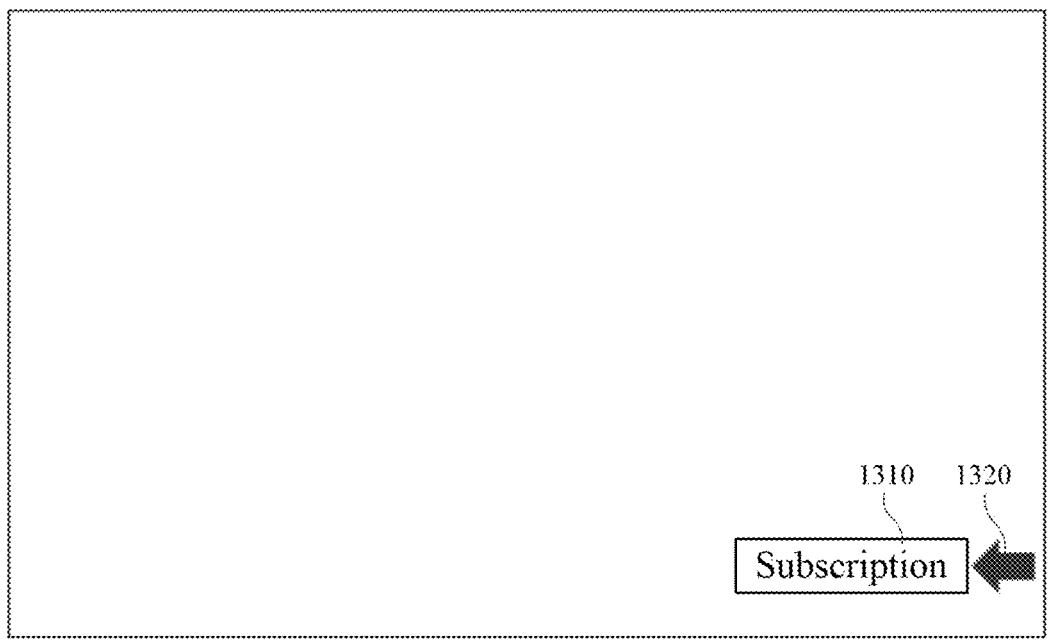
FIG. 13 is a diagram for explaining the concept of mapping a content table address to a channel through an advertisement.

FIG. 13 is a diagram for explaining the concept of mapping a content table address to a channel through an advertisement.

As described in FIG. 8 configuration, when playing online multimedia contents, advertisements may be displayed in various ways. Also, a content editor can also advertise different content tables. For example, the content editor may advertise a new content table by providing a subscription button 1310 as shown in FIG. 13. In addition, if a user wants to map a corresponding content table address to a specific channel according to the advertisement, it is not easy to enter the content table address or an ID number or set an email or a message or the like from the advertisement since it is very cumbersome.

Accordingly, the set-top box may detect a pre-designated command button such as the subscription button 1310 in the advertisement and display a pre-designated specific color area 1320 next to the location where the pre-designated command button is displayed as shown in FIG. 13. Here, the content table address may be linked in advance to the pre-designated button by the content editor.

Then, when the user selects a color button (here, the red color button 910) of the same color as the color designated in the area 1320 corresponding to the pre-designated button among the plurality of color buttons 910 to 930 of the remote control 900 shown in FIG. 9, the set-top box can directly map the linked content table address to a specific channel. In other words, it is possible to easily map the content table address to a channel by simply pressing a color button without entering the content table address or the ID number or setting an email or a messenger. In addition, the colors displayed on the screen may be displayed in various ways depending on the tasks. In other words, as shown in FIG. 8, the color of the corresponding area may be changed to a specific color, and as shown in FIG. 10, it may be displayed in the form of a color box at a specific location. In addition, a shape such as an arrow or the like may be used as shown in FIG. 13.

In addition, the set-top box can perform tasks such as re-setting and deleting a mapped channel through a conventional menu.

A method according to an embodiment of the disclosure can be implemented as a computer program stored in a medium for execution on a computer. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM (random access memory), CD-ROM's, DVD-ROM's, magnetic tapes, floppy disks, optical data storage devices, etc.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. An apparatus for providing online multimedia contents, the apparatus is configured to:

acquire, in a pre-designated manner, a content table address in which a content table consisting of a plurality of content information with each set time to be played back is stored, and map and store the content table address to a designated channel;

obtain the content table based on the content table address, and analyze a content information corresponding to a current time among the plurality of content information included in the content table to obtain a content address where a multimedia content is stored; and acquire the multimedia content online based on the obtained content address, and output the multimedia content through a TV, wherein when an ID number is inputted in a pre-designated format, the apparatus for providing online multimedia contents transmits the inputted ID number to an ID number mapping server, and obtains a content table address corresponding to the ID number sent by the ID number mapping server.

2. The apparatus for providing online multimedia contents of claim 1, wherein the apparatus for providing online multimedia contents acquires the content table address from a user command or from an email or a message obtained through a pre-set email address or a pre-set messenger ID.

3. The apparatus for providing online multimedia contents of claim 2, wherein the apparatus for providing online multimedia contents filters emails or messages containing a pre-designated password or transmitted from a pre-designated sender or a pre-designated server, and extracts a content table address from the filtered emails or messages.

4. The apparatus for providing online multimedia contents of claim 1, wherein the content table comprises update version information and the plurality of content information, wherein each of the plurality of content information comprises a content title (<title>), a content address (<internet address>), a start time (<start time>), an end time (<end time>), backward allowance to allow backward selection of a previous content in the content table (<backward>) and forward allowance to allow forward selection of a next content (<forward>), and option setting (<option>).

5. The apparatus for providing online multimedia contents of claim 4, wherein the content information further comprises a date (<date>) and reference time information (<reference time>), and is provided in the form of <date: 0000:00:00><reference time: UTC time><start time: 00:00><end time: 00:00><title: abc><internet address: https://aaa.bbb.ccc><forward: Y/N><backward: Y/N><option: choice>.

6. The apparatus for providing online multimedia contents of claim 4, wherein the apparatus for providing online multimedia contents calculates a time difference between a current time and a start time specified by the content information corresponding to the current time, and outputs the acquired multimedia content through the TV from a time interval corresponding to the calculated time difference.

7. The apparatus for providing online multimedia contents of claim 1, wherein when the content table is periodically delivered via emails or messages, the apparatus for providing online multimedia contents maps and saves an email address or a messenger ID to a designated channel.

8. The apparatus for providing online multimedia contents of claim 1, wherein when additional information is delivered to the multimedia content, the apparatus for providing online multimedia contents displays an action item using a pre-designated color in an area corresponding to the delivered additional information, and when a color command corresponding to the pre-designated color is inputted from a remote control in which a plurality of colored buttons designated in different colors are arranged, converts the color command into a selection command corresponding to the action item.

9. The apparatus for providing online multimedia contents of claim 1, wherein when an integrated content table is obtained in which a plurality of content tables are integrated based on the content table address, the apparatus for providing online multimedia contents maps the plurality of content tables integrated in the integrated content table to a channel, and when a command to change a multimedia content within the channel is inputted by pressing a channel-in-channel button on a remote control that has channel buttons and separate channel-in-channel buttons, obtains the content address of the multimedia content to be played at the current time by changing the content table among the plurality of content tables integrated in the integrated content table.

10. The apparatus for providing online multimedia contents of claim 1, wherein the apparatus for providing online multimedia contents comprises:
an interface unit for converting a signal transmitted through a remote control to obtain a user command;
a channel setting unit for mapping and storing the content table address to a pre-designated channel, and when a channel to which the content table address is mapped is selected, receiving and analyzing the content table according to the content table address, and obtaining the content address of the multimedia content to be played at the current time;
a communication unit for obtaining the content table online based on the content table address, delivering it to the channel setting unit, and receiving the corresponding multimedia content based on the content address; and
a content acquisition unit for obtaining the multimedia content through the communication unit, converting the multimedia content into an image signal that can be outputted from a TV, and outputting the image signal.

11. A method for providing online multimedia contents carried out by an apparatus for providing online multimedia contents, the method comprising the steps of:
acquiring, in a pre-designated manner, a content table address in which a content table consisting of a plurality of content information with each set time to be played back is stored, and mapping and storing the content table address to a designated channel
obtaining a content table based on the content table address;
analyzing content information corresponding to the current time among the plurality of content information included in the content table to obtain a content address where a multimedia content is stored; and
acquiring the multimedia content online based on the obtained content address and outputting the multimedia content through TV,
wherein the step of mapping and storing the content table address to the channel comprises the steps of:
when an ID number in a pre-designated format is inputted, transmitting the inputted ID number to an ID number mapping server; and
receiving the content table address corresponding to the ID number from the ID number mapping server, and storing the content table address to the channel.

12. The method for providing online multimedia contents of claim 11, wherein in the step of mapping and storing the content table address to the channel, the content table address is received and stored as a user command.

13. The method for providing online multimedia contents of claim 11, wherein the step of mapping and storing the content table address to the channel comprises the steps of:
obtaining emails or messages according to a pre-set email address or a pre-set messenger ID;
filtering the obtained emails or messages containing a pre-designated password or transmitted from a pre-designated sender or a pre-designated server; and
extracting the content table address from the filtered emails or messages, and storing the content table address to the channel.

14. The method for providing online multimedia contents of claim 11, wherein the content table comprises update version information and the plurality of content information, wherein each of the plurality of content information comprises a content title (<title>), a content address (<internet address>), a start time (<start time>), an end time (<end time>), backward allowance to allow backward selection of a previous content in the content table (<backward>) and forward allowance to allow forward selection of a next content (<forward>), and option setting (<option>).

15. The method for providing online multimedia contents of claim 14, wherein the step of outputting through TV comprises the steps of:
calculating a time difference between a current time and a start time specified by the content information corresponding to the current time; and
outputting the acquired multimedia content through the TV from a time interval corresponding to the calculated time difference.

16. The method for providing online multimedia contents of claim 11, wherein when the content table is periodically delivered via emails or messages, the apparatus for providing online multimedia contents maps and saves an email address or a messenger ID to a designated channel.

17. The method for providing online multimedia contents of claim 11, wherein the method for providing online multimedia contents further comprises the steps of:
- when additional information is delivered to the multimedia content, displaying an action item using a pre-designated color in an area corresponding to the delivered additional information; and
- when a color command corresponding to the pre-designated color is inputted from a remote control in which a plurality of colored buttons designated in different colors are arranged, converting the color command into a selection command corresponding to the action item.

18. The method for providing online multimedia contents of claim 11, wherein the method for providing online multimedia contents further comprises the steps of:
- when an integrated content table is obtained in which a plurality of content tables are integrated based on the content table address, mapping the plurality of content tables integrated in the integrated content table to a channel; and
- when a command to change a multimedia content within the channel is inputted by pressing a channel-in-channel button on a remote control that has channel buttons and separate channel-in-channel buttons, obtaining the content address of the multimedia content to be played at the current time by changing the content table among the plurality of content tables integrated in the integrated content table.

* * * * *